United States Patent [19]

Darden et al.

[11] Patent Number: 4,850,552
[45] Date of Patent: Jul. 25, 1989

[54] LANDING GEAR LOAD TRANSDUCER

[75] Inventors: Paul E. Darden, Arlington; Billy H. Dickson, Hurst, both of Tex.

[73] Assignee: Bell Helicopter Textron Inc., Fort Worth, Tex.

[21] Appl. No.: 119,831

[22] PCT Filed: Apr. 29, 1987

[86] PCT No.: PCT/US87/00936
§ 371 Date: Apr. 29, 1987
§ 102(e) Date: Apr. 29, 1987

[87] PCT Pub. No.: WO88/08391
PCT Pub. Date: Nov. 3, 1988

[51] Int. Cl.⁴ .................. B64C 25/02; B64C 25/52
[52] U.S. Cl. .................. 244/100 R; 244/108; 244/1 R
[58] Field of Search .......... 244/100 R, 108, 1 R; 73/65; 364/463, 567; 177/136, 137

[56] References Cited

U.S. PATENT DOCUMENTS

| | | |
|---|---|---|
| 2,443,045 | 6/1948 | Magruder et al. ............ 73/65 |
| 2,559,718 | 7/1951 | Goodlett et al. ............ 364/463 |
| 2,615,330 | 10/1952 | Blackmon et al. ............ 364/463 |
| 2,722,587 | 11/1955 | Buzzetti et al. ............ 201/63 |
| 3,136,154 | 6/1964 | Christensen ............ 73/88 |
| 3,387,802 | 6/1968 | Cruz ............ 244/108 |
| 3,513,300 | 5/1970 | Elfenbein et al. ............ 364/463 |
| 3,602,041 | 8/1971 | Weinert ............ 73/116 |
| 3,603,418 | 9/1971 | Schmidt et al. ............ 177/136 |
| 3,620,074 | 11/1971 | Laimins et al. ............ 73/141 A |
| 3,650,340 | 3/1972 | Bradley ............ 177/136 |
| 3,701,279 | 10/1972 | Harris et al. ............ 73/65 |
| 3,802,523 | 4/1974 | Clark ............ 177/146 |
| 3,878,908 | 4/1975 | Andersson et al. ............ 177/136 |
| 3,991,618 | 11/1976 | Stampfer et al. ............ 73/432 R |
| 4,215,754 | 8/1980 | Hagedorn et al. ............ 177/137 |

FOREIGN PATENT DOCUMENTS 2520870 8/1983 France ............ 244/100 R

Primary Examiner—Joseph F. Peters, Jr.
Assistant Examiner—Rodney Corl
Attorney, Agent, or Firm—Richards, Harris, Medlock & Andrews

[57] ABSTRACT

A landing gear load sensor (24) for an aircraft (10) having a skid type landing gear (14) is provided. The sensor (24) includes a shear beam (30) having a loadbearing area (40). Structure (32, 34) is provided for mounting the shear beam (30) to the aircraft (10), such that the loadbearing area (40) is disposed adjacent the landing gear (14). Structure (50) is disposed on the shear beam (30) between the mounting structure (32, 34) and the loadbearing area (40) for sensing shear load on the shear beam (30).

24 Claims, 4 Drawing Sheets

LANDING GEAR LOAD TRANSDUCER

TECHNICAL FIELD

This invention relates to load transducers, and more particularly to a transducer for use with an aircraft having a skid type energy absorbing landing gear.

BACKGROUND ART

Many helicopter performance factors are affected by the actual gross weight at which a helicopter is being operated. To make the best use of an aircraft and to avoid unsafe operation, it is important for the pilot to have reasonably accurate knowledge of the gross weight of the aircraft and load. Closely related, and also important, is the knowledge of the center of gravity location relative to aircraft limitations.

Attempts have been made to develop an on-board aircraft weighing system which will provide a direct indication of gross weight and the center of gravity of the aircraft. Attempts have also been made to measure gross weight by using various sensors installed in and on the landing gear of an aircraft. For aircraft using oleo strut type landing gears, attempts have involved the use of pressure transducers to measure the oleo pressure. Because of friction in the oleo strut, this approach has not provided the necessary accuracy in determining gross weight. Load transducers have been proposed in various systems to eliminate friction, but these approaches have been complex, involving increased weight with marginal accuracy.

Additional approaches to measuring gross weight have involved the use of strain gauges. Strain gauges have been installed directly on existing parts of the landing gear as well as being placed inside axle shafts using collet arrangements. However, accuracy has been poor due to low strain levels during normal operation.

Therefore, a need has arisen for a landing gear load sensor for use in an on-board weighing system which provides an accurate measurement of the gross weight of an aircraft. More particularly, a need has arisen for a strain gauged landing gear load transducer which operates at strain levels that are sufficiently high to produce an accurate measurement of critical shear load while being insensitive to other loads. Further, a need has arisen for a landing gear load sensor that is light weight and can be adapted to various types of landing gear configurations.

DISCLOSURE OF THE INVENTION

In accordance with the present invention, a landing gear load sensor for an aircraft having a skid type landing gear is provided which substantially eliminates the problems heretofore associated with such sensors.

In accordance with the present invention, a landing gear load sensor for an aircraft having a skid type landing gear is provided. The load sensor includes a shear beam having a loadbearing area. The shear beam is mounted to the helicopter, such that the loadbearing area is disposed adjacent the landing gear. Structure is disposed on the shear beam between the loadbearing area and the point of mounting to the aircraft for sensing shear load on the shear beam.

In accordance with another aspect of the present invention, a landing gear load sensor for a helicopter having a skid type landing gear is provided. The sensor includes a shear beam having first and second ends with a loadbearing area disposed between the ends. Structure extends from the first and second ends of the shear beam for mounting the shear beam to the helicopter, such that the loadbearing area is disposed adjacent the landing gear. Structure is disposed on the front and back surfaces of the shear beam and between the ends of the shear beam and the point of attachment to the helicopter for sensing shear load on the shear beam.

In accordance with another aspect of the present invention, a landing gear load transducer for determining the weight of an aircraft having a landing gear including a pair of skids is provided. A pair of shear beams is mounted to each of the cross tubes between the skids. The shear beams each include a loadbearing surface which is mounted adjacent the cross tubes. Structure is mounted on the shear beam between the point of attachment to the helicopter and the loadbearing area for sensing shear load on each of the shear beams and for generating a signal representative of the shear load on each of the shear beams. A processor is provided for receiving the shear signals generated by the sensor for calculating the gross weight of the helicopter.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION

Figure 1:
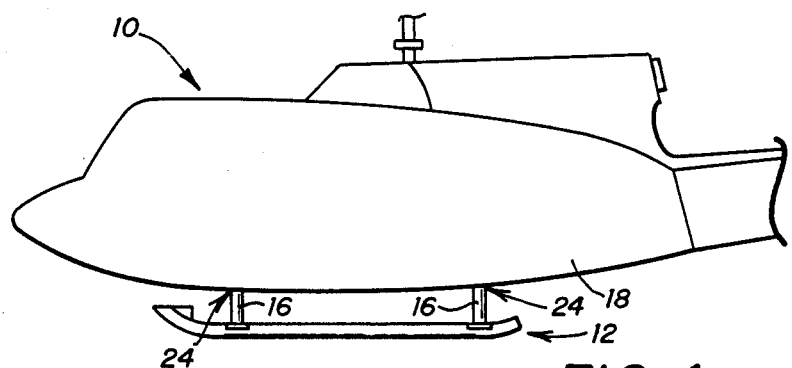
FIG. 1 is a partial side elevational view of a helicopter aircraft utilizing the present landing gear load sensor.
Figure 2:
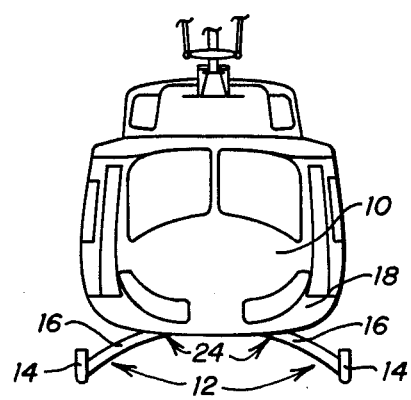
FIG. 2 is a front view of the helicopter shown in FIG. 1.

Referring simultaneously to FIGS. 1 and 2, a helicopter, generally identified by the numeral 10 is illustrated. Helicopter 10 is shown as having a skid type energy absorbing landing gear, generally identified by the numeral 12. Landing gear 12 includes skids 14 and a pair of arch-shaped cross tubes 16 which are attached to fuselage 18 of helicopter 10. Cross tubes 16 are attached to the fuselage 18 at four points.

The present landing gear load sensor, generally identified by the numeral 24, is disposed at the four points of attachment between cross tubes 16 and fuselage 18 of helicopter 10. Load sensors 24 bear directly on the circular cross-section of cross tubes 16 and are loaded at their center by a respective cross tube 16. Landing gear load sensor 24 will be subsequently described with respect to FIGS. 3 and 4. Although the present landing gear load sensor 24 has been illustrated as being utilized with a helicopter, helicopter 10 is shown for illustrative purposes only, it being understood that the present load sensor can be utilized with any type of aircraft utilizing a skid type landing gear.

Figure 3:
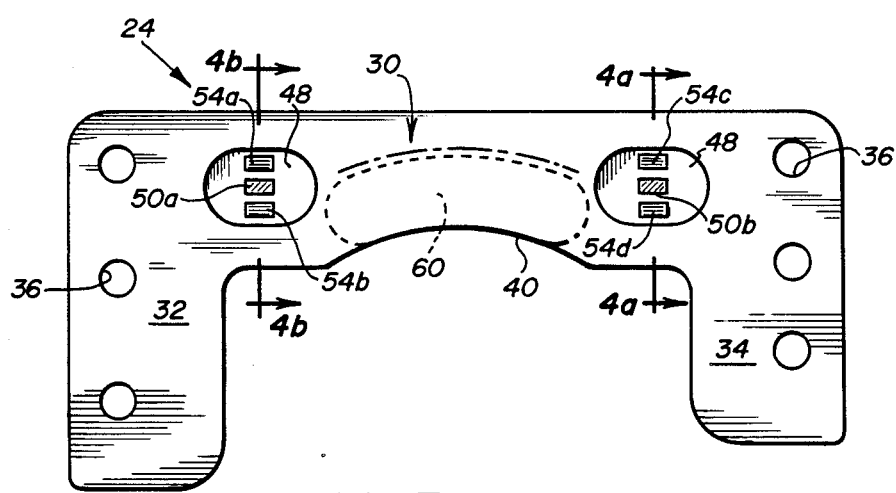
FIG. 3 is a side elevational view of the present landing gear load sensor.
Figure 4A:
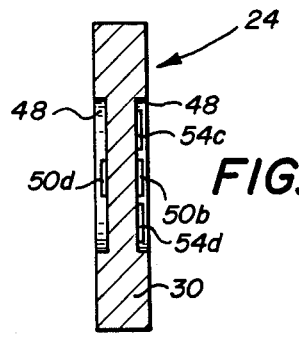
FIGS. 4a and 4b are sectional views taken generally along sectional lines 4a-4a and 4b-4b of FIG. 3 illustrating the gauges of the present load sensor.
Figure 4B:
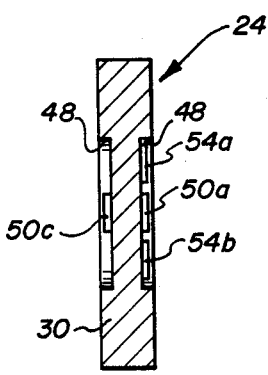

Referring simultaneously to FIGS. 3 and 4, landing gear load sensor 24 is illustrated as having a generally U-shaped configuration. The central portion of the load sensor comprises a shear beam 30. Shear beam 30 is disposed between the legs of the U which comprise installation tabs 32 and 34. Installation tabs 32 and 34 include a plurality of apertures 36 for mounting load sensor 24 to the fuselage 18 of helicopter 10. Shear beam 30 extends for a distance between installation tabs 32 and 34.

Shear beam 30 includes an arcuate portion 40 which is the loadbearing area of load sensor 24. Shear beam 30 senses the change in shear force exerted by cross tubes 16.

Shear beam 30 includes a pair of webs 48 of reduced thickness on each side of shear beam 30 in which a strain gauge 50a, 50b, 50c or 50d is mounted. Strain gauges 50a, 50b, 50c and 50d may comprise, for example, a model MA-06-125DW-120-E manufactured and sold by Measurements Group, Inc. Strain gauges 50 are mounted with the grid lines at a 45° orientation to shear beam 30 in each of webs 48 such that a total of four strain gauges 50 utilized for each landing gear load sensor 24. Landing gear load sensor 24 therefore comprises a double shear beam type of sensor with four strain gauges 50 per sensor 24. Load sensor 24 operates with a strain level that is sufficiently high to produce an accurate measurement.

Load sensor 24 also includes four strain gauges 54a, 54b, 54c and 54d disposed within webs 48 on one side of shear beam 30. Strain gauges 54 are mounted with grid lines parallel to shear beam 30, and may comprise, for example, a model EA-06-125BZ-350-E manufactured and sold by Measurements Group, Inc. Strain gauges 54 provide bending compensation so as to make load sensor 24 insensitive to variations in bending due to flexing in fuselage 18, stiffness variations in the attachment area or looseness in the fasteners mounted through apertures 36 of load sensor 24. Load sensor 24 is therefore rendered insensitive to side loading and variations in the load application point due to the motion of cross tubes 16.

Figure 5:
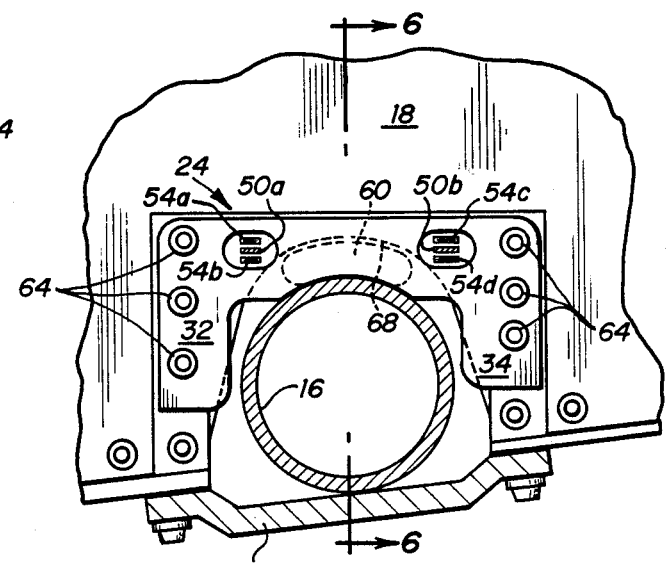
FIG. 5 is a side elevational view of the present landing gear load sensor illustrating the sensor mounted to the aircraft and a portion of the cross tube of the landing gear shown in FIGS. 1 and 2.
Figure 6:
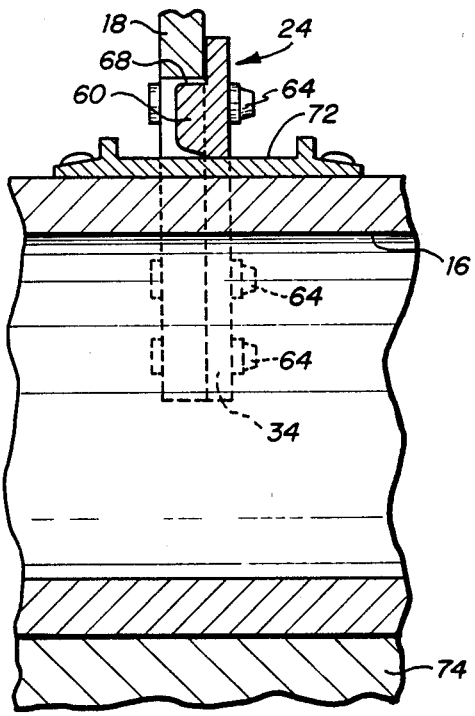
FIG. 6 is a sectional view taken generally along sectional lines 6—6 of FIG. 5.

Referring now to FIGS. 5 and 6, landing gear load sensor 24 is attached to fuselage 18 of helicopter 10 utilizing fasteners 64 which pass through apertures 36 on installation tabs 32 and 34 of shear beam 30. Shear beam 30 further includes raised boss 60 disposed adjacent the loading bearing area of shear beam 30. Raised boss 60 carries overloads on landing gear load sensor 24 directly to fuselage 18 of helicopter 10. Load sensor 24 is installed such that there is a gap 68 between raised boss 60 and fuselage 18. Gap 68 is closed by deflection of shear beam 30 due to higher than normal loads experienced by shear beam 30 upon a hard landing of helicopter 10. Gap 68 is sized such that normal landing loads do not allow raised boss 60 to contact fuselage 18. Gap 68 allows shear beam 30 to freely deflect upon unexperiencing shear forces. Cross tube 16 is mounted to fuselage 18 between a wear fitting 72 and a cap assembly 74. Cap assembly 74 is intended to support landing gear 12 while helicopter 10 is in flight. Cap assembly 74 does not apply loads to landing gear 12 while helicopter 10 is supported by landing gear 12.

Figure 7:
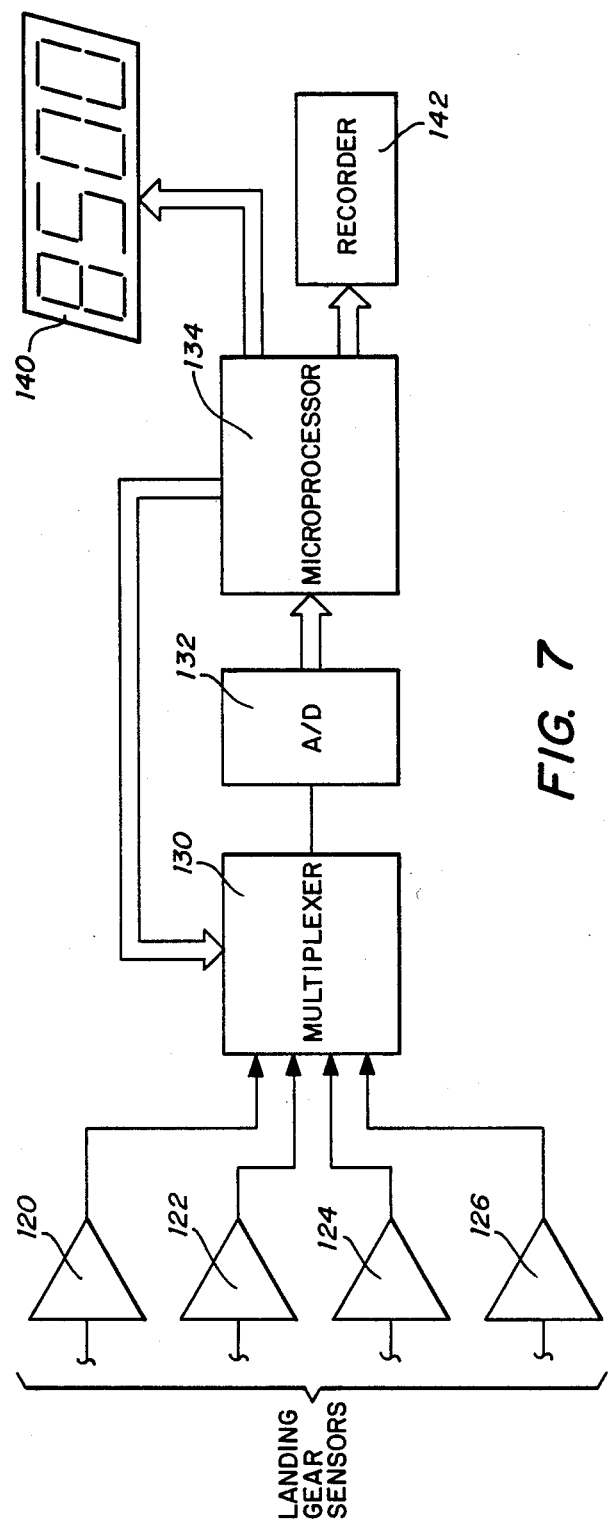
FIG. 7 is an electrical block diagram illustrating the use of the present landing gear load sensor for calculating and displaying gross weight and the center of gravity of an aircraft.

The gross weight of helicopter 10 is equal to the sum of the weight supported by each of the four landing gear load sensors 24. Referring to FIG. 7, the output of each of the circuits 80 (FIG. 8) associated with each of the four load gear landing sensors are applied to amplifiers 120, 122, 124, and 126 respectively. Outputs of amplifiers 120, 122, 124 and 126 are applied to a multiplexer 130 whose output is applied by an analog to digital converter 132 to a microprocessor 134. Microprocessor 134 performs the necessary mathematical manipulations to calculate the gross weight of helicopter 10 in a manner well known to those skilled in the art. Additionally, microprocessor 134 can also be utilized to calculate the center of gravity of helicopter 10, using procedures also well known to those skilled in the art. One such method being illustrated in U.S. Pat. No. 2,443,045.

The output of microprocessor 134 is applied to a display 140 located in helicopter 10 for view by the pilot. Display 140 may display the gross weight or center of gravity of helicopter 10 as selected by the pilot. Additionally, an output of microprocessor 134 may be applied to a recorder 142 for continuously recording gross weight and center of gravity parameters of helicopter 10.

Figure 8:
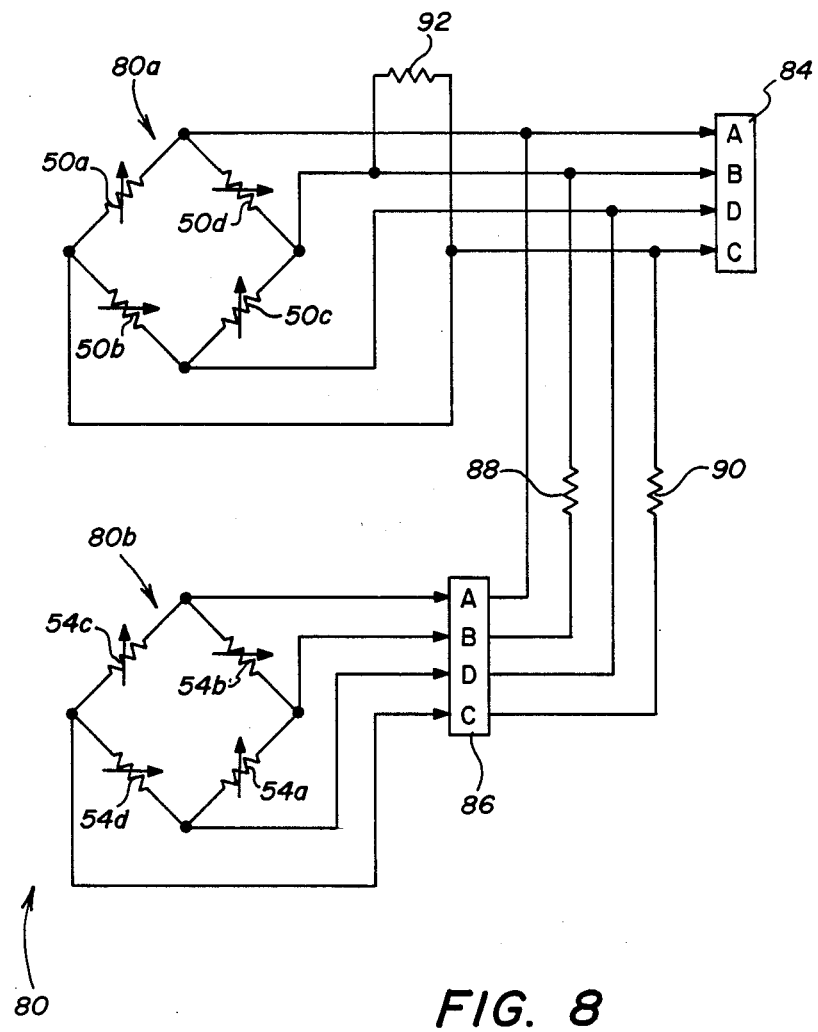
FIG. 8 is an electrical schematic diagram illustrating the circuitry utilized with the present landing gear load sensor.

Referring to FIG. 8, an electrical schematic diagram of the circuitry interconnecting strain gauges 50 and strain gauges 54 is illustrated. Pairs of strain gauges 50 respond to the shear strain in the area within a web 48 of shear beam 30 and are connected in a bridge circuit, generally identified by the numeral 80. Strain gauges 50 are interconnected in a primary bridge circuit 80a whose output is applied to a terminal strip 84. Strain gauges 54 are interconnected in a bridge circuit 80b whose output is applied to a terminal strip 86. The output of the bridge circuit 80b is used to compensate primary bridge circuit 80a comprising strain gauges 50 so that strain gauges 50 responds to shear loading only. The output of strain gauges 54 through terminal strip 86 is applied to terminal strip 84 through compensator resistors 88 and 90. The output of bridge circuit 80 is normalized through the use of a normalizing resistor 92. The A and B output at terminal strip 84 represent a positive excitation signal and the D and C output represents a negative excitation signal.

Therefore, it can be seen that the present invention provides for a strain gauged landing gear load sensor for installation in aircraft above the landing gear. The present sensor incorporates a double shear beam type of sensor having four strain gauges per sensor. The present sensor also includes a built in stop arrangement that allows the sensor to carry overloads which may be encountered during hard landings or in a crash condition of the aircraft. The present sensor is insensitive to loads other than the vertical shear load from the landing gear and includes bending compensators so as to make the sensor insensitive to variations in the stiffness or flexing of the aircraft structure to which it is attached. The present sensor is also lightweight and can be adapted to various types of landing gear designs.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A landing gear load sensor for an aircraft having a skid type landing gear comprising:
   a shear beam having a loadbearing area;
   means for mounting said shear beam to the aircraft, such that said loadbearing area is disposed adjacent the landing gear; and
   means disposed on said shear beam between said mounting means and said loadbearing area for sensing shear load on said shear beam.

2. The load sensor of claim 1 wherein said shear load sensing means includes:
   strain gauge transducers.

3. The load sensor of claim 1 wherein said mounting means includes:
   means extending from said shear beam for contacting the aircraft to enable said shear beam to deflect when loaded.

4. The load sensor of claim 1 and further including:
   means disposed on said shear beam for sensing bending loads on said shear beam.

5. The load sensor of claim 1 wherein said shear beam includes first and second ends and front and back sides, such that said loadbearing area is disposed between said first and second ends and said sensing means disposed adjacent said first and second ends on said front and back sides of said shear beam.

6. The load sensor of claim 1 wherein said sensing means are disposed within an area of reduced thickness upon said shear beam.

7. The load sensor of claim 5 and further including:
   means disposed on said shear beam front side between said first and second ends for transferring loading of said shear beam to the aircraft.

8. A landing gear load sensor for a skid type landing gear of a helicopter comprising:
   a shear beam having first and second ends, front and back surfaces and a loadbearing area disposed between said first and second ends;
   first and second mounting means extending respectively from said first and second ends of said shear beam for mounting said shear beam to the helicopter, such that said loadbearing area is disposed adjacent the landing gear; and
   means disposed on said front and back surfaces of said shear beam adjacent said loadbearing area and between said first end of said shear beam and said first mounting means and between said second end of said shear beam and said second mounting means for sensing shear load on said shear beam.

9. The load sensor of claim 8 wherein said shear load sensing means includes:
   strain gauge transducers.

10. The load sensor of claim 8 and further including:
    means disposed on said shear beam adjacent said loadbearing area for transferring high impact forces to the helicopter.

11. The load sensor of claim 8 and further including:
    means attached to said shear beam adjacent said shear load sensing means for sensing bending loads on said shear beam thereby rendering said shear beam insensitive to variations in bending.

12. The load sensor of claim 8 wherein said mounting means includes means for mounting said shear beam spaced apart from the helicopter opposite the area of said loadbearing area to enable said shear beam to deflect when loaded.

13. The load sensor of claim 8 and further including:
    means connected to said shear load sensing means for determining the weight of the helicopter.

14. A landing gear load transducer for detecting the weight of a helicopter having a landing gear including first and second skids interconnected by first and second cross tubes comprising:
    first and second shear beams having first and second ends mounted to the helicopter adjacent the first cross tube;
    third and fourth shear beams each having first and second ends mounted to the helicopter adjacent the second cross tube;
    said shear beams each having a loadbearing area;
    mounting means for mounting each of said shear beams to the helicopter, such that said loadbearing area is disposed adjacent a cross tube;
    means disposed on each of said shear beams between said mounting means and said loadbearing area for sensing shear load on each of said shear beams and for generating a signal representative of said shear load on each of said shear beams; and
    processor means for receiving said signals generated by said sensing means for calculating the gross weight of the helicopter.

15. The load transducer of claim 14 and further including:
    means for calculating the center of gravity of the helicopter.

16. The load transducer of claim 14 wherein said means for mounting includes:
    means extending from said first and second ends of said shear beams.

17. The load transducer of claim 14 and further including:
    load transfer means mounted to each of said shear beams for contacting the helicopter upon excessive loading of said shear beams for transferring the load from said shear beams to the helicopter.

18. The load transducer of claim 17 wherein said load transfer means is disposed spaced apart from the helicopter.

19. The load transducer of claim 14 wherein said sensing means includes:
    strain gauge means mounted between said first end of said shear beam and said loadbearing area and between said second end of said shear beam and said loadbearing area.

20. The load transducer of claim 14 and further including:
    means disposed adjacent said sensing means on each of said shear beams for sensing bending loads on each of said shear beams.

21. The load transducer of claim 19 wherein said strain gauge means are mounted to said shear beams in an area of reduced cross-sectional area.

22. The load transducer of claim 17 wherein said load transfer means includes an area of increased cross-sectional area.

23. The load transducer of claim 14 and further including:
    means connected to said processor means for displaying the gross weight of the helicopter.

24. The load transducer of claim 15 and further including:
    means connected to said processor for displaying the center of gravity of the helicopter.

* * * * *

UNITED STATES PATENT AND TRADEMARK OFFICE
CERTIFICATE OF CORRECTION

PATENT NO. : 4,850,552
DATED : July 25, 1989
INVENTOR(S) : Darden, et al.

It is certified that error appears in the above-identified patent and that said Letters Patent is hereby corrected as shown below:

Column 4, line 40, "responds" should read --respond--.

Column 4, line 45, "represent" should read --represents--.

Signed and Sealed this

Seventh Day of August, 1990

Attest:

HARRY F. MANBECK, JR.

*Attesting Officer*   *Commissioner of Patents and Trademarks*